United States Patent [19]

Tokuda et al.

[11] Patent Number: 5,194,207
[45] Date of Patent: Mar. 16, 1993

[54] FISHING ROD MANUFACTURING METHOD

[75] Inventors: Isamu Tokuda; Kiyohiko Matsumoto; Jun Saeki, all of Sakai, Japan

[73] Assignee: Shimano, Inc., Osaka, Japan

[21] Appl. No.: 711,873

[22] Filed: Jun. 7, 1991

[30] Foreign Application Priority Data

Jun. 14, 1990 [JP] Japan .................................. 2-156469
Sep. 28, 1990 [JP] Japan .................................. 2-262355

[51] Int. Cl.$^5$ ........................ B29C 45/14; A01K 87/06
[52] U.S. Cl. ..................................... 264/129; 156/187;
156/193; 264/138; 264/255; 264/258; 264/279;
264/318
[58] Field of Search ............... 264/257, 255, 155, 129,
264/138, 139, 250, 258, 259, 279, 318, 328.1;
156/168, 172, 187, 193

[56] References Cited

U.S. PATENT DOCUMENTS

2,252,054 8/1941 Welch ..................................... 43/23
4,762,584 8/1988 Andreasen et al. ................. 156/245

FOREIGN PATENT DOCUMENTS

1500073 6/1966 France .
2274407A 6/1974 France .
2461453 7/1979 France .
1581667 4/1977 United Kingdom .
2185671 12/1986 United Kingdom .

Primary Examiner—Jay H. Woo
Assistant Examiner—James P. Mackey
Attorney, Agent, or Firm—Dickstein, Shapiro & Morin

[57] ABSTRACT

A fishing rod is manufactured by forming a tubular small diameter portion on an outer surface of a rod material. The small diameter portion is formed continuous with and between a pair of walls substantially perpendicular to an axis of the rod material. Then a seat base is formed by placing a pair of dies around the small diameter portion and injecting a heated thermoplastic resin into a cavity (inside space) defined by the dies.

6 Claims, 5 Drawing Sheets

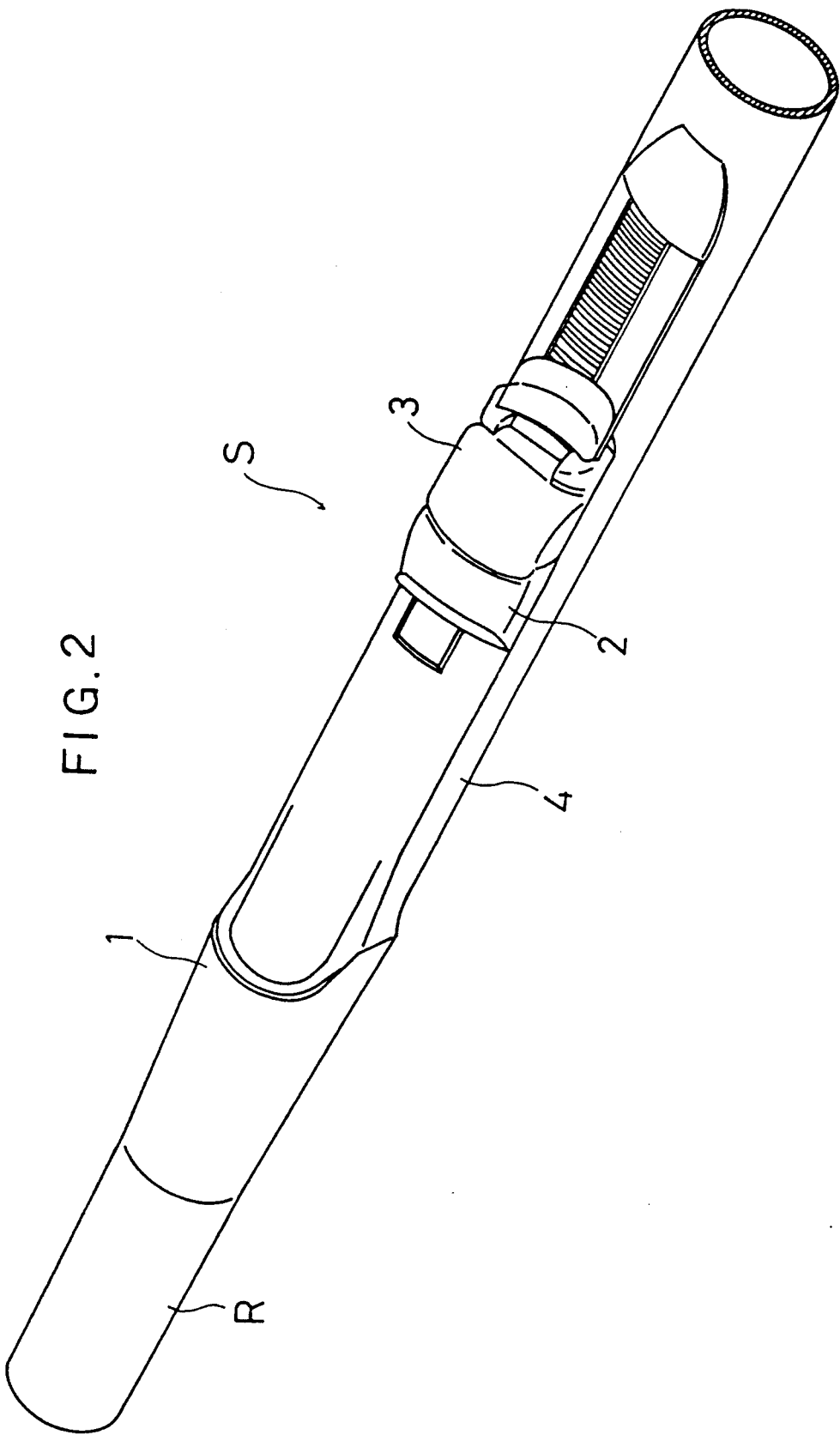

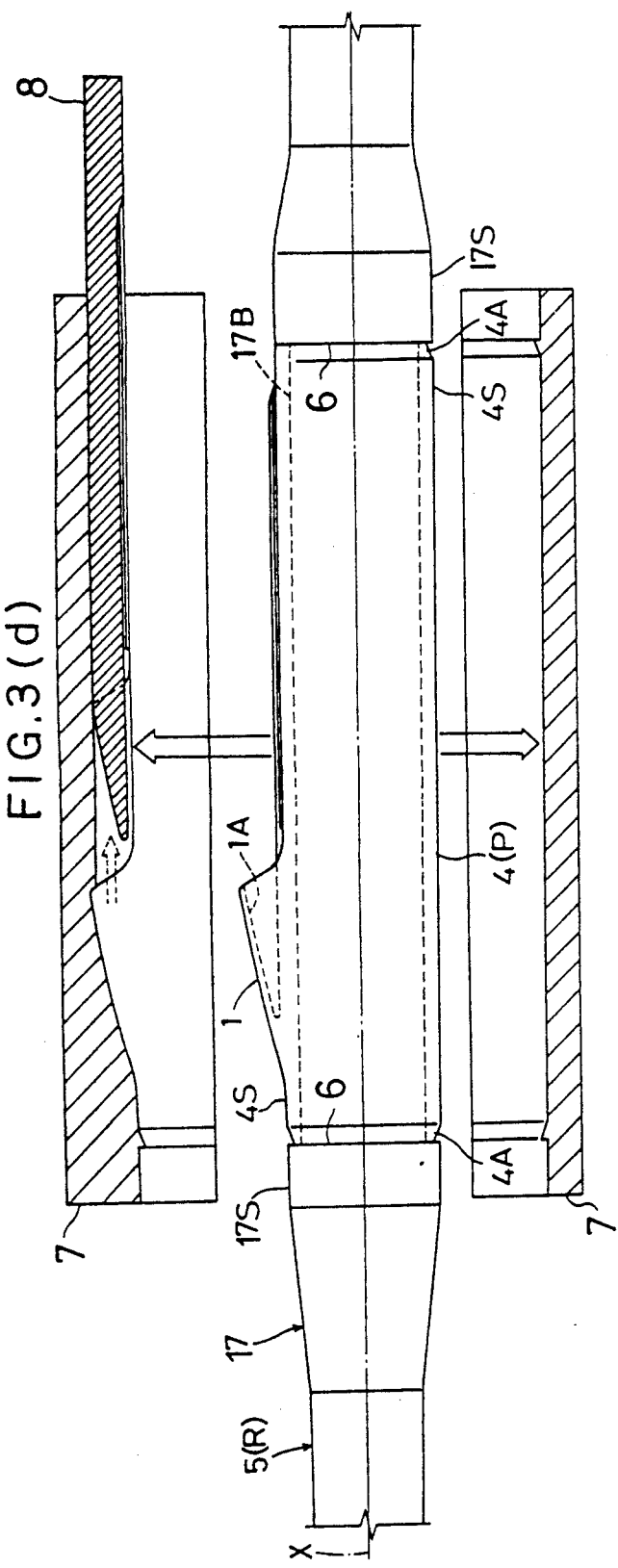
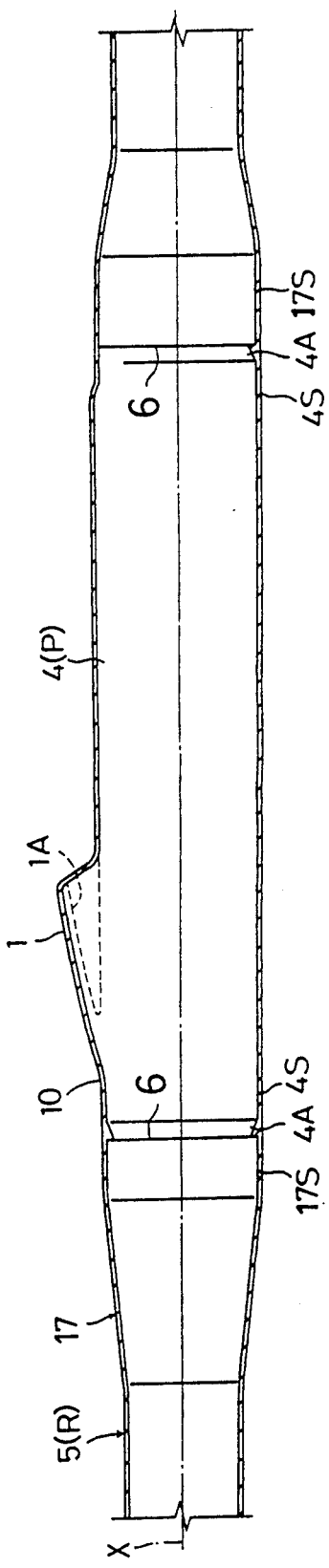

5,194,207

FISHING ROD MANUFACTURING METHOD

BACKGROUND OF THE INVENTION

1. Field of the Invention

This invention relates to a method of manufacturing fishing rods, and more particularly to a technique of forming a reel seat on a rod stock.

2. Description of the Related Art

A known example of reel seat formed on a rod stock is disclosed in Japanese Utility Model Publication Kokai No. 1989-168166. In this example, a reel seat is formed on a rod stock by securely fitting a seat base including a fixed hood on a rod material and thereafter attaching a movable hood.

The operation to securely fit the seat base on the rod material requires application of an adhesive since the seat base, which normally has a tubular shape, is fixed through bonding between an inside surface thereof and an outside surface of the rod material.

On the other hand, the material for forming fishing rods called glass rods or carbon rods is manufactured by baking a prepreg in sheet form wound on a gently tapering core. Consequently, the rod material has a gently tapering outer surface. The rod material manufactured in this way is cut at opposite ends after the core is drawn out. Any error in the cutting position results in errors in diameters at certain positions of the rod material which are determined by the ends of the rod material. Consequently, inconveniences may be encountered when fixation of the seat base is attempted, such as a gap being formed between the inside surface of the seat base and the outside surface of the rod material, or the seat base stopping short of a desired position on the rod material. Thus, there is room for improvement.

SUMMARY OF THE INVENTION

An object of the present invention is to provide a method of rigidly forming a seat base on a desired position of the rod material with ease.

The above object is fulfilled, according to the present invention, by a fishing rod manufacturing method comprising the steps of forming an annular small diameter portion on an outer surface of a rod material to be continuous with and between a pair of walls substantially perpendicular to an axis of the rod material, and forming a seat base by using dies between the walls to act as a reel seat.

With this method, as shown in FIGS. 1(a), 1(b) and 1(c) for example, a small diameter portion 5B is formed such as by cutting an outer surface of a rod material 5(R), and thereafter a resin P is injected inside dies 7, thereby forming a seat base 4 integral with the rod material 5. When the resin P is injected, walls 6 prevent movement of the resin P. The space formed between the outer surface of the rod material 5A and the dies 7 is much smaller than the space formed between the small diameter portion 5B and the dies 7. The small space between the outer surface of the rod material 5A and the dies would produce a great resistance to movement of the resin P if the resin should flow into this space. This is effective to avoid formation of burs between the dies 7 and rod material 5A. Further, the seat base 4 thus formed has a thickness corresponding to a difference in level between the outer surfaces of the rod material 5A and the small diameter portion 5B. Thus, the resin P forming the seat base 4 is effectively prevented from peeling off.

Since the seat base is formed by using dies according to the present invention, the step of forming a separate seat base is no longer required, nor is the step of applying an adhesive. The invention saves the time and trouble of setting a separate seat base to an appropriate position.

Thus, the invention provides a method of manufacturing fishing rods, which forms a seat base on an appropriate position of a rod material smoothly and rigidly without any cumbersome operation.

A resin layer having reinforcing fibers extending substantially circumferentially of the rod material may be formed prior to formation of the small diameter portion on the outer surface of the rod material. This step provides the following advantages.

In the process shown in FIGS. 3(a), 3(b), 3(c) and 3(d), for example, a resin layer 17 having reinforcing fibers F extending in the predetermined direction is formed such as by padding the rod material 5 prepared beforehand. The reinforcing fibers F of the resin layer 17 extend in the direction to resist shrinkage of the resin P circumferentially of the rod. Consequently, the resin layer 17 is free from damage such as cracks against a strong stress acting during or after formation of the seat base 4.

Where the seat base 4 is formed by using dies as noted above, the pressure of injection of the resin P or the pressure due to thermal shrinkage occurring after the seat base formation acts circumferentially of the rod material 5. By setting the direction of the reinforcing fibers F circumferential as noted above, the reinforcing fibers F resist the circumferential pressure to avoid damage.

Since the seat base is formed by using dies, the step of forming a separate seat base is no longer required, nor is the step of applying an adhesive, as noted hereinbefore. The invention saves the time and trouble of setting a separate seat base to an appropriate position, and besides positively avoids formation of burs and the inconvenience due to shrinkage following the seat base formation.

Thus, the invention provides a method of manufacturing fishing rods, which forms a seat base on an appropriate position of the rod material smoothly and rigidly without any cumbersome operation, and which effectively avoids cracks and other damage due to the characteristic internal stress occurring after the seat base formation.

Other features and advantages of this invention will be apparent from the following description made with reference to the accompanying drawings.

BRIEF DESCRIPTION OF THE DRAWINGS

The drawings show methods of manufacturing fishing rods according to the present invention, in which:

FIG. 2 is a perspective view of a reel seat, FIGS. 3(a), 3(b), 3(c), 3(d) and 3(e) show various stages of manufacturing a seat base in another embodiment of the invention, wherein:

3(a) is a sectional view of prepregs wound on a mandrel,

3(b) is a sectional view showing walls formed after baking,

3(c) is a sectional view showing a resin injected into dies,

3(d) is a side view of a completed seat base, and

3(e) is a sectional view of a coating applied to the seat base, and

Figure 3A:
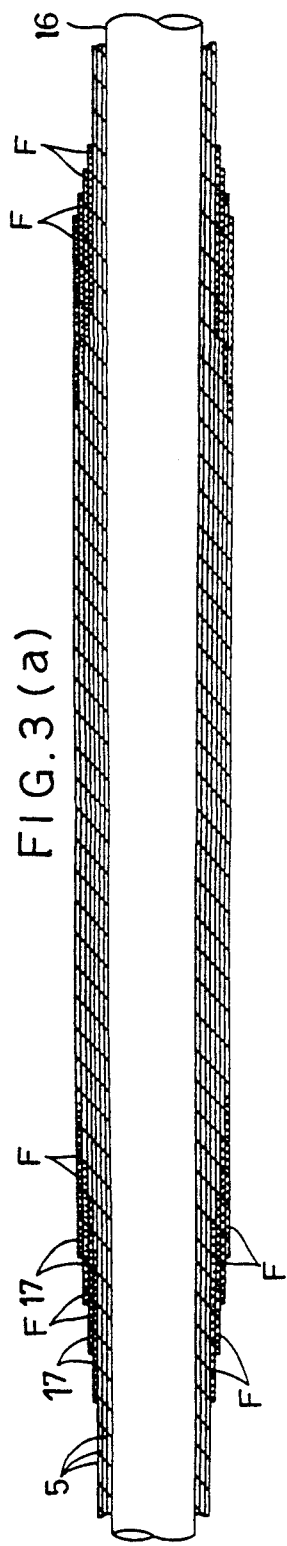
Figure 3B:
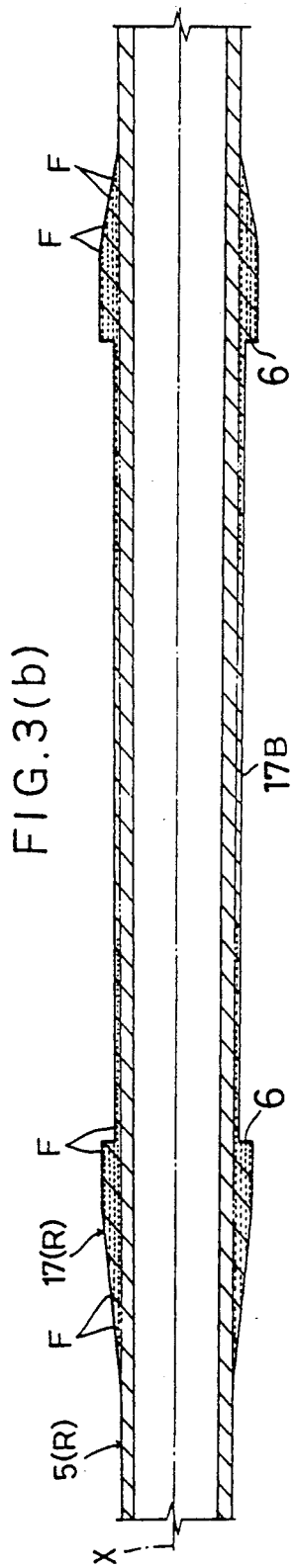
Figure 3C:
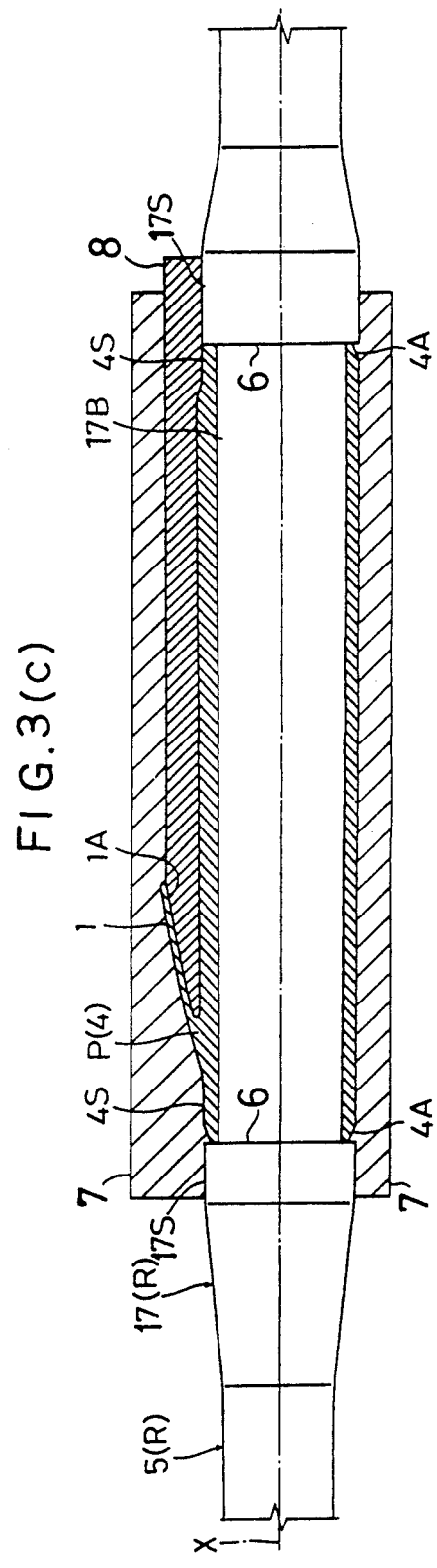
Figure 4:
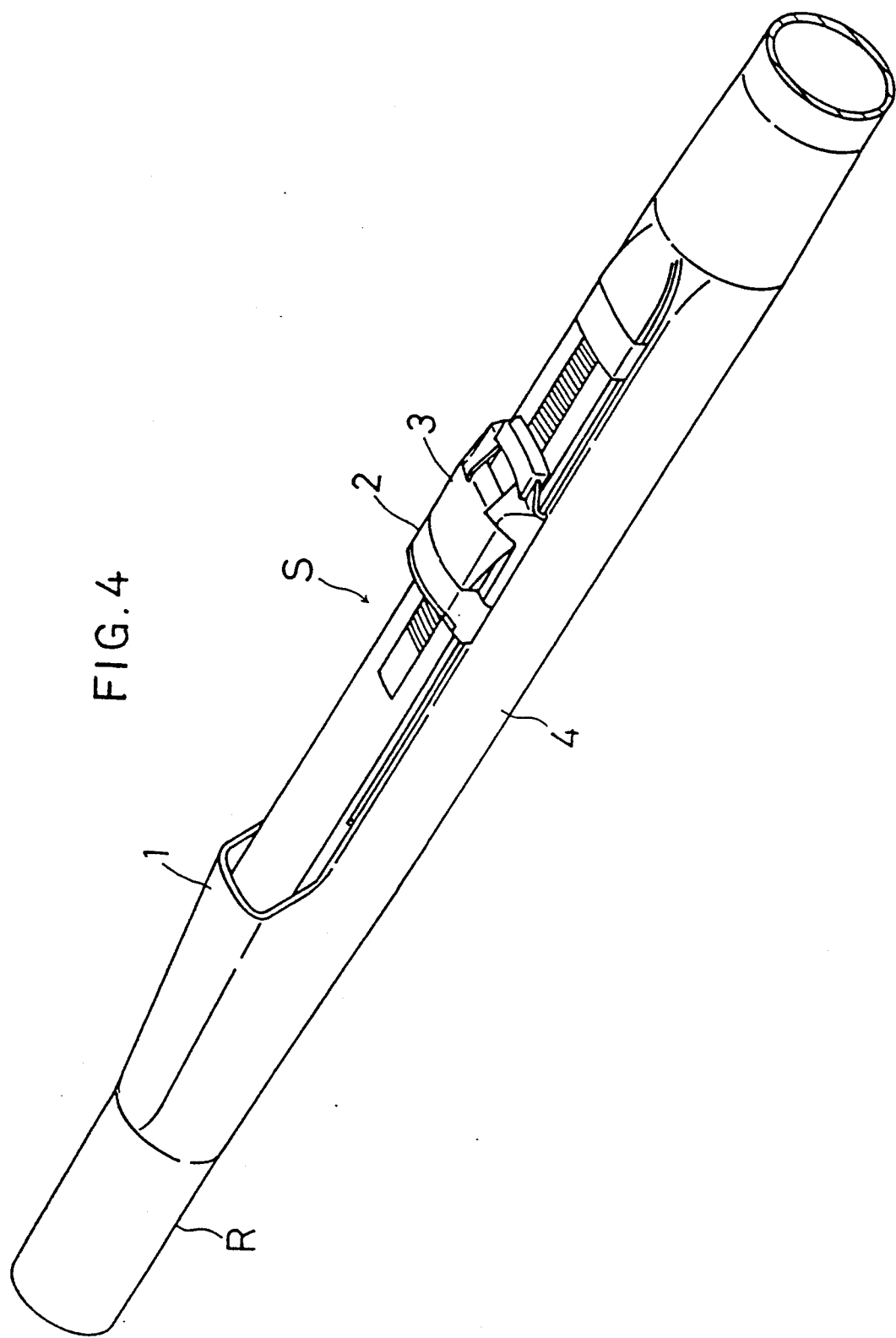

FIG. 4 is a perspective view of a reel seat manufactured by the process shown in FIGS. 3(a), 3(b), 3(c), 3(d) and 3(e).

DETAILED DESCRIPTION OF THE PREFERRED EMBODIMENTS

Methods of manufacturing fishing rods according to the present invention will be described in detail with reference to the drawings.

FIG. 2 shows a reel seat S formed on a rod stock R. The reel seat S comprises a fixed boot 1, movable boot 2, and a lock 3 for positioning the movable boot 2. These components are defined on a seat base 4 integral with the rod stock R. The seat base 4 is formed on the rod stock R as follows.

Figure 1A:
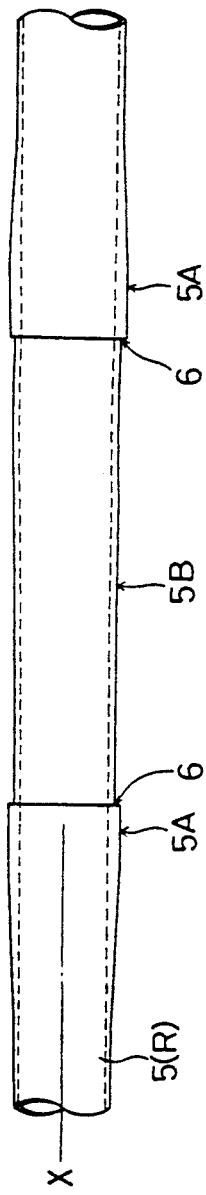
FIGS. 1(a), (b) and (c) are sectional side views showing a process of manufacturing a seat base.

As shown in FIGS. 1(a), (b) and (c), a rod material 5(R) formed in advance with a large diameter portion 5A is used in this manufacturing process. As shown in FIG. 1(a), an outer surface of the large diameter portion 5A is cut to form an annular small diameter portion 5B continuous with a pair of walls 6 rising perpendicular to an axis X of the rod material 5.

According to the present invention, the small diameter portion 5B may be formed by means other than cutting.

Figure 1B:
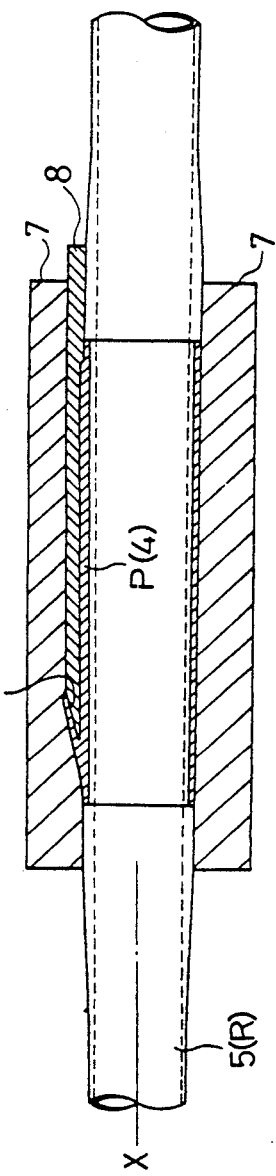
Figure 1C:
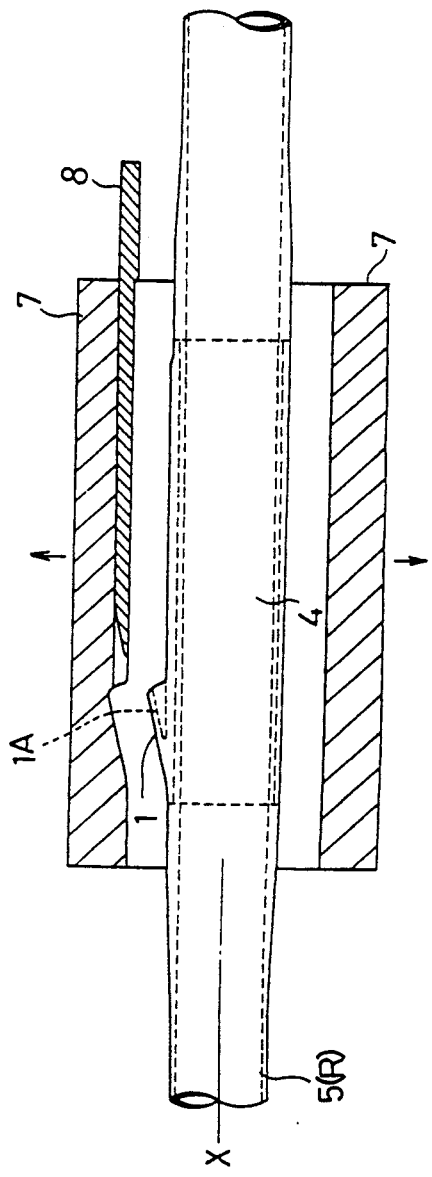

Next, as shown in FIG. 1(b), upper and lower dies 7 are fitted together around the small diameter portion 5B. The upper die 7 includes a slidable core element 8 for forming a recess 1A for engaging the fixed boot 1.

Next, a heated thermoplastic resin P is injected under pressure into a cavity (inside space) defined by the dies 7. Thus, the seat base 4 is formed on the rod material 5(R) by injection molding.

After the core element 8 is slid in a pull-out direction, the dies 7 are separated to complete the process of forming the seat base 4. The reel seat S is completed by subsequently placing the movable boot 2 and lock 3 in position.

This embodiment may be modified in various ways as follows:

(a) Press shaping is employed in which the dies are pressed and heated after a thermoplastic resin sheet is placed, e.g. wound, on the rod material.

(b) In the case of a rod material formed by baking a prepreg wound on a core, a seat base as noted above is formed before removing the core. Where the seat base is formed prior to removal of the core, the rod material is free from damage due to the pressure of injection of the resin into the dies.

(c) The small diameter portion is formed continuous with large diameter portions, such as by die forming, when forming the large diameter portions of a resin or the like on surfaces of the rod material, instead of the cutting process. Alternatively, the small diameter portion is formed by selecting positions for winding a prepreg when manufacturing the rod material.

(d) Glass fiber, nylon fiber or the like may be mixed as a reinforcement into the resin used for the injection molding. What is known as engineering plastics may be used to secure increased strength.

A further embodiment of the present invention will be described next.

FIG. 4 shows a reel seat S formed on a rod stock R by a fishing rod manufacturing method in this embodiment. The reel seat S comprises a fixed boot 1, movable boot 2, and a lock 3 for positioning the movable boot 2. These components are defined on a seat base 4 integral with the rod stock R. The seat base 4 is formed on the rod stock R as follows.

As shown in FIG. 3(a), a prepreg 5 for forming a rod material is wound in plural layers on a mandrel 16 with fibers extending in a predetermined direction as when forming an ordinary rod material. Another prepreg 17 is wound on a position where the seat base is to be formed, with reinforcing fibers F extending circumferentially of the rod material. Then, a baking process is carried out.

The prepregs fuse into an integrated whole after the baking. The part resulting from one of the prepregs is called herein a rod material 5, and the part resulting from the other a resin layer 17.

Next, as shown in FIG. 3 (b), the outer surface of the resin layer 17 (R) is ground with a centerless grinder to improve roundness and smoothness of the surface. The centerless grinder is used further to grind the resin layer 17 (R) down to form a small diameter portion 17B between a pair of walls 6 rising perpendicular to an axis X of the material 5.

Next, as shown in FIG. 3 (c), upper and lower dies 7 are fitted together around the small diameter portion 5B. The upper die 7 includes a slidable core element 8 for forming a recess 1A for engaging the fixed boot 1. The dies 7 and the outer surface of the resin layer 17 (R) form a space of 0.08 mm or less therebetween.

Next, a heated thermoplastic resin P is injected under pressure into a cavity (inside space) defined by the dies 7. Thus, the seat base 4 is formed on the rod material 5 (R) by injection molding.

The seat base 4 becomes rigidly fixed as a result of shrinkage of the resin P following its formation.

As shown in FIG. 3 (d), after the core element 8 is slid in a pull-out direction, the dies 7 are separated to complete the process of forming the seat base 4. Subsequently, as shown in FIG. 3 (e), an extendible coating film 10 is formed over the outer surfaces of the seat base 4 and resin. Then, the reel seat S is completed by placing the movable boot 2 and lock 3 in position.

The resin layer 17 has an outer surface 17S finished level with a straight portion of the outer surface of the seat base 4 to provide smoothness to the touch. In order to avoid formation of burs with increased effect during the above process, the dies 7 are shaped to produce slight constrictions at opposite ends 4A of the seat base 4.

The extendible coating is used in order to avoid cracks in the coating due to a difference in the coefficient of thermal expansion between the resin layer 17 formed by baking and the seat base 4 formed by injection.

This embodiment may be modified in various ways as follows:

(a) The small diameter portion and boundary walls thereof are formed, not by grinding, but by adjusting winding positions or quantities of relatively narrow prepregs.

(b) In the case of a rod material formed by baking a prepreg wound on a core, a seat base is formed as described above before the step of drawing out the core. Where the seat base is formed prior to removal of the core, the rod material is free from damage due to the pressure of injection of the resin into the dies.

(c) A prepreg having a crisscross pattern of reinforcing fibers is used to form the resin layer. Alternatively, reinforcing fibers are wound on the rod material and then a resin is applied and hardened.

(d) Glass fiber, nylon fiber or the like may be mixed as a reinforcement into the resin used for the injection molding. What is known as engineering plastics may be used to secure improved strength.

(e) A non-circular section is formed in part of the small diameter portion for preventing rotation due to a torque acting on the seat base.

Apart from these modifications, any other types of materials may be used for forming the reel seat. The reel seat thus formed may have a construction for allowing the movable hood to be screw fed. Where the reel seat has a screw feed type construction, a threaded portion may be formed by using dies.

What is claimed is:

1. A method of manufacturing a fishing rod, the method comprising the steps of:

forming on a rod material a resin layer having reinforcing fibers extending substantially circumferentially of said rod material;

baking said rod material with said resin layer;

forming substantially flat side portions of an outer surface of said resin layer to contact a die so as not to form any gaps when said side portions come into contact with said die;

forming an annular small diameter portion by thinning a central portion of said outer surface of said resin layer between said side portions, said small diameter portion being continuous with and between a pair of walls in said resin layer substantially perpendicular to an axis of said rod material;

placing a pair of mating dies respectively on said side portions to form a cavity surrounding said small diameter portion; and forming a seat base between said pair of walls to act as a reel seat by pressure-injecting a heated thermoplastic resin into said cavity.

2. A fishing rod manufacturing method as claimed in claim 1, wherein said step of placing said pair of dies includes inserting a slidable core into one of said dies placed around said small diameter portion for forming a recess in the seat base for engaging a fixed boot.

3. A fishing rod manufacturing method as claimed in claim 2, wherein said seat base is formed to have slightly constricted opposite ends.

4. A fishing rod manufacturing method as claimed in claim 2, wherein, after said seat base is formed, an extendible film of coating is formed over outer surfaces of said seat base and said resin layer.

5. A fishing rod manufacturing method as claimed in claim 3, wherein, after said seat base is formed, an extendible film of coating is formed over outer surfaces of said seat base and said resin layer.

6. A method of manufacturing a fishing rod as claimed in claim 1, wherein said step of forming the annular small diameter portion on the outer surface of said resin layer is effected by means of cutting.

* * * * *